Patented July 24, 1934

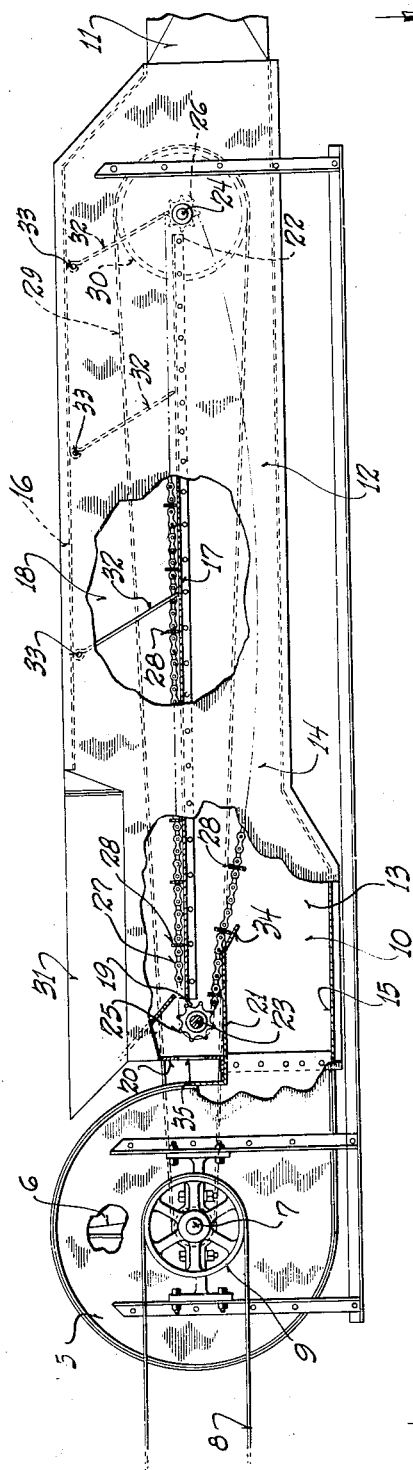

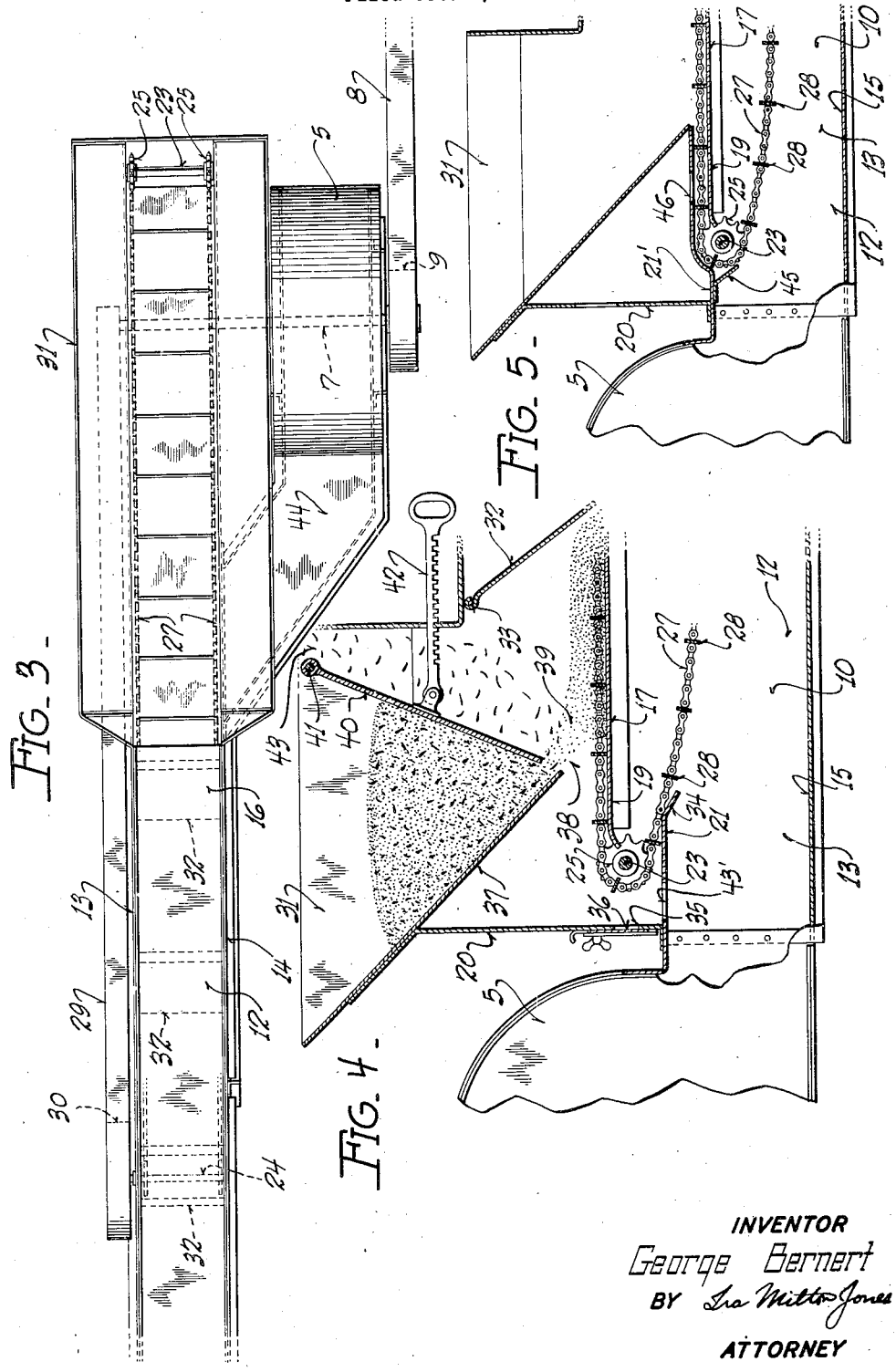

1,967,462

UNITED STATES PATENT OFFICE 1,967,462

PNEUMATIC CONVEYING APPARATUS

George Bernert, Milwaukee, Wis.

Application October 7, 1931, Serial No. 567,411

28 Claims. (Cl. 302—36)

This invention relates to certain new and useful improvements in pneumatic conveying apparatus and has a general object to provide an apparatus of this character which is capable of handling and delivering a wide variety of materials varying in size and shape, from grain and small seeds to coal and small castings.

Obviously the conventional endless conveyer having a series of slats which move over the bottom of a mechanical conveyer casing, is best adapted to carry such different materials into the conveying current of air. This type of conveyer is simple and with proper control of back pressure, efficiently feeds practically any type of material into the conveying air current.

However, pneumatic conveying apparatus which employed this type of mechanical conveyer, heretofore in use and of which Patent No. 1,737,561, issued to George Bernert, December 3rd, 1929, is representative, have been objectionable for the reason that their construction was such that the necessary passageway for the returning stretch of the conveyer afforded a substantial path for back draft.

The structure of the Bernert patent was a substantial improvement over the then existing apparatus, but it did not solve the problem in that instead of eliminating back draft, it merely released it. This resulted in an appreciable loss of power; and much material was carried with the back draft. This material was either wasted or some means had to be provided for its collection. In either case it was a nuisance.

It is therefore another object of this invention to provide novel means for introducing the material to be conveyed, into the current of conveying air in such a manner that back draft is reduced to a negligible minimum and the loss of materials ordinarily carried along with the back draft is entirely precluded.

It is a further object of this invention to provide an apparatus of the character described in which an endless mechanical conveyer is employed to carry materials from a hopper or other point of reception into the conveying current of air, and in which a substantial portion of the returning stretch of the endless conveyer is disposed within the air duct to be subjected to the direct force of the forwardly moving pressure current of air, whereby a relatively long column of conveying air exists between the entrance of the material into the air duct and the point of egress of the mechanical conveyer therefrom so that back draft at the entrance of the material into the duct does not exist and consequently the escape of even very light particles of material from the air duct with the exit of the mechanical conveyer therefrom, is impossible.

Another object of this invention resides in the provision of an apparatus of the character described which is so constructed as to facilitate the feeding of materials of relatively long length into the air duct.

Another object of this invention resides in the provision of a feeder casing which is divided into an air duct and a mechanical conveyer casing one substantially above the other so that the returning stretch of an endless chain conveyer in the mechanical conveyer casing hangs down into the air duct to be subjected directly to the cleaning influence of the air passing therethrough.

Another object of this invention resides in the provision of means whereby the slight leakage of air from the conveyer duct to the mechanical conveyer casing, which results from the opening between the two casings through which the endless conveyer travels from one into the other, is utilized to clean grain and other similar material of chaff and dirt.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, several complete examples of the physical embodiment of this invention are illustrated constructed according to the best modes so far devised for the practical application of the principles thereof, and in which:

Figure 1 is a side elevation view of a pneumatic conveyer constructed in accordance with this invention and having parts broken away and in section to illustrate structural details;

Figure 2 is a side elevation of a slightly modified form of conveyor apparatus constructed in accordance with this invention;

Figure 3 is a top plan view of the structure illustrated in Figure 2;

Figure 4 is an enlarged detail section view illustrating the manner in which grain and other similar material is cleaned of chaff and dirt; and Figure 5 is a detail section view illustrating a slightly modified construction at the point of egress of the mechanical conveyer from the air duct.

Referring now more particularly to the accompanying drawings in which like numerals indicate like parts throughout the several views, the numeral 5 represents the casing of a conventional blower having a fan 6 mounted therein. The fan is secured to a shaft 7 which is adapted to be driven from any suitable source, not shown, through a belt 8 trained about a pulley 9 fixed to the shaft. The current of air set up by the blower fan 6 passes outwardly into a conveying duct 10 and then into a trunk or pipe line 11 connected therewith.

The conveyer duct 10 forms part of a casing indicated generally by the numeral 12 which comprises side walls 13 and 14 connected by a bottom wall 15 and a top wall 16. A partition wall 17 also secured to the side walls 13 and 14 divides the casing 12 into super-imposed chambers, the conveyer duct 10 at its bottom, and a material receiving or mechanical conveyer casing 18 thereabove.

The inner end 19 of the partition wall 17 terminates short of the rear wall 20 of the conveyer casing 18, which extends upwardly from a short wall 21 projected from the blower casing 5 on a plane beneath the partition wall 17, and the forward end 22 thereof is spaced from the outer end of the casing 12. Communication is thus established between the material receiving casing 18 and the air duct 10 at both ends.

Journalled adjacent the opposite ends of the partition 17 are shafts 23 and 24 which mount pairs of sprockets 25 and 26, respectively, and about which endless chains 27 are trained. The location of these shafts and the diameter of the sprockets is such that the upper stretches of the chains 27 are just slightly above the plane of the partition wall 17.

The chains 27 carry transversely extending slats 28 which are of such height as to engage the top surface of the partition wall 17 as the chains are moved. The chains together with the transverse slats connecting them thus form an endless mechanical conveyer which is driven from the shaft 7 by a belt or the like 29 trained about a small pulley on the shaft 7 and a larger pulley 30 on the shaft 24.

At the end of the casing adjacent the blower fan the top wall 16 is cut away and the sides of the casing 13 and 14 together with the rear wall 20 are flared outwardly as at 31 to provide a hopper in which the materials to be conveyed are received. Material received in the hopper 31 falls onto the adjacent portion of the wall 17 and is conducted forwardly by the transverse slats moving with the chains 27 to the forward end 22 of the partition wall 17 where it drops into the conveying current of air traveling forwardly into the air duct 11. Leakage of air back through the mechanical conveyer casing 18 above the conveyed material and from the front end of the structure, is prevented by a series of valves or gate members 32 hingedly mounted as at 33 directly beneath the top wall 16.

It is observed that the lower returning stretch of the mechanical conveyer is substantially entirely within the air duct 10 and that its return to the mechanical conveyor casing 18 is at a point considerably removed from the point of introduction of the material into the air duct. Hence, there is a comparatively long column of forwardly moving air between the entrance of the material into the air duct and the point of egress of the returning stretch of the mechanical conveyer from the air duct. This long column of forwardly moving air under pressure positively precludes back draft at the forward end of the casing at which point the material enters the air duct. Consequently, it is impossible for even the lighest particles of material to move back through the air duct and escape through the passage provided for the return of the mechanical conveyer to the upper casing.

To prevent the slats 28 from becoming caught on the leading edge of the short section of wall 21, the extreme end thereof is preferably turned down as at 34.

The bottom wall 15 of the casing 12 at its point of connection with the blower casing 5 is on a plane spaced beneath the plane of the major portion of the bottom wall a distance substantially the same as the space between the partition wall 17 and the short section of wall 21, so that the same cross sectional area is maintained throughout the entire air column.

Inasmuch as a slight amount of air escapes from the air duct 10 through the opening between the wall 21 and the inner end 19 of the partition wall 17 through which the mechanical conveyer returns to the upper casing, the adjacent rear wall 20 is provided with an opening 35 to normally relieve and prevent any such back pressure as may be built up by this leakage of air, from puffing up into the hopper.

In some instances, however, it may be desirable to conduct a current of air through the material being handled to clean the same, and in Figure 4, a modified construction is illustrated in which the air escaping from the air duct with the returning mechanical conveyer, is effectively utilized for this purpose. The opening 35 is then closed by a suitable door 36 and the rear wall 37 of the hopper terminates above the partition wall 17 to define an open space 38. The air from the air duct 10 thus passes through this open space 38 and to escape to the atmosphere must pass through a falling curtain of grain 39 at the lower edge of the hopper wall 37.

The wall 40 of the hopper opposite the wall 37 is adjustably mounted as at 41 and is adjustably held in any desired position with respect to the wall 37 to control the volume of the falling curtain of grain, by means 42. Thus the curtain of falling grain may be adjusted so as to obtain the best results and to enable the air passing through the open space 38 to thoroughly clean the same. The material removed from the grain passes upwardly with the exhausted air through an opening 43 at the top of the hopper.

If the air escaping from the duct through the passage through which the mechanical conveyer returns to the upper casing is insufficient, an opening 43' may be provided in the wall 21 adjacent the rear wall 20. This opening, however, has no effect upon the pneumatic conditions at the forward end of the device or at the point of entrance of the material into the duct, so that even with this additional opening material cannot move backwardly through the air duct.

The loss of air pressure from the air duct 10 into the mechanical conveyer casing also may be effectively reduced by a construction as illustrated in Figure 5. In this instance, the wall 21' which forms a continuation of the upper wall of the outlet end of the blower, instead of passing beneath the adjacent portion of the mechanical conveyer is directed upwardly to overlie the adjacent end 19 of the partition wall 17. The distance between the overlying portion of the wall 21' and the adjacent portion of the partition wall 17 is but slightly greater than the height of the slats 28 to just permit the slats to pass therebetween and as the overlying portion of the wall 21' is of such length that at least two slats are at all times positioned between it and the partition wall 17, communication between the air duct 10 and the mechanical conveyer casing is reduced to a minimum.

A deflector plate 45 may be secured to the underside of the wall 21' to further preclude the loss of air pressure at the point of egress of the mechanical conveyer; and a hole 46 is preferably provided in the overlying portion of the wall 21' to relieve what little back draft there may be.

Figures 2 and 3 illustrate a construction which lends itself particularly well to the handling of the long material such as corn stalks, wood lathes, and similar articles which cannot be carried past abrupt turns or angles in the conveyer. In this construction the outlet end 11 of the conveyer duct is in line with the mechanical conveyer casing and the blower 5 is positioned to one side of the main casing 12. The outlet of the blower fan 5 is connected with the air duct 10 at a medial point by a diagonally extending trunk 44, but as in the embodiment illustrated in Figure 1, a substantial portion of the lower stretch of the conveyer chains and the slats carried thereby, travels in the conveying duct 10 forwardly of the point of ingress of the pressure current of air therein to be subjected directly to the cleaning influences of the air.

From the foregoing description taken in connection with the accompanying drawings, it will be readily apparent to those skilled in the art to which an invention of the character described appertains that the conveyer apparatus of this invention is particularly well adapted to handling and delivering a wide variety of materials, and that it provides effective and simple means for preventing back draft at the entrance of the material into the air duct so that backing up of the material through the air duct is impossible.

What I claim as my invention is:

1. In a pneumatic conveyer, an air duct, means for procuring a conveying pressure current of air therein, an endless mechanical conveyer for conducting material to be conveyed into the air duct, and means mounting the mechanical conveyer so that the major portion of its returning stretch is disposed within the air duct.

2. In a pneumatic conveyer apparatus, an air chamber, blower means for discharging a conveying pressure current of air into said air chamber, a material receiving chamber, a partition separating said chambers, and an endless conveyer for carrying material from the material receiving chamber into the air chamber, said endless conveyer having its conveying stretch on one side of the partition within the material receiving chamber and its return stretch on the other side of the partition within the air chamber.

3. In a pneumatic conveyer apparatus, an air duct, blower means for discharging a conveying pressure current of air into said duct, a material receiving hopper above the air duct, a partition separating the air duct from the material receiving hopper, and an endless conveyer for carrying material from the material receiving hopper into the air duct, said endless conveyer having its conveying stretch above the partition in the material receiving hopper and its return stretch beneath the partition and in the air duct.

4. In a pneumatic conveyer, an air duct, blower means for discharging a conveying pressure current of air into the air duct, a material receiving hopper, the bottom of the material receiving hopper forming one wall of the air duct, and an endless conveyer for carrying material from the hopper into the air duct and having its conveying stretch traveling above the bottom of the hopper and its return stretch beneath the hopper bottom and in the air duct.

5. In a pneumatic conveyer, an air duct, means for discharging a conveying pressure current of air into the duct, a material receiving chamber, a partition separating the air duct from the material receiving chamber while maintaining communication between the material receiving chamber and the air duct at spaced points, an endless conveyer for carrying material from the material receiving chamber into the air duct, and means adjacent the points of communication between the chamber and the air duct for mounting the endless conveyer with its conveying stretch on one side of the partition within the material receiving chamber and its return stretch on the other side of the partition in the air duct.

6. In a pneumatic conveyer apparatus, a casing including spaced walls, a partition connecting the spaced walls and dividing the casing into an air chamber and a material receiving chamber, means for discharging a conveying pressure current of air into the air chamber, and an endless conveyer for carrying material from the material receiving chamber into the air chamber, said endless conveyer having its conveying stretch within the material receiving chamber and its return stretch in the air chamber.

7. A pneumatic conveyer apparatus comprising a casing including spaced walls, a partition connecting the spaced walls and dividing the casing into an air duct and a material receiving chamber with the material receiving chamber directly above the air duct and the partition forming the bottom of the material receiving chamber and one wall of the air duct, an endless conveyer for carrying material from the material receiving chamber into the air duct, means mounting the endless conveyer so that its conveying stretch travels over the top of the partition and its return stretch is disposed beneath the partition within the air duct, and means connected with the air duct to discharge a conveying pressure current of air into the air duct, the point of connection of said means with the air duct being so located with respect to the endless conveyer that a substantial portion of its return stretch is always subjected to the direct blast of pressure current of air.

8. In a pneumatic conveyer apparatus, an air chamber, a material receiving chamber directly adjacent the air chamber with one wall common to both chambers, means for discharging a conveying pressure current of air into the air chamber, and an endless conveyer for carrying material from the material receiving chamber into the air chamber and having its conveying stretch on one side of the common wall within the material receiving chamber and its return stretch on the other side of the common wall within the air chamber to be subjected to the direct blast of the pressure current of air.

9. In a pneumatic conveyer, an air chamber, a material receiving chamber, said chambers having one wall common to both, and said wall being of such length as to leave communicating passages from one chamber to the other at each end of said common wall, means for discharging a conveying pressure current of air into the air chamber, an endless conveyer for carrying materials from the material receiving chamber into the air chamber, means adjacent the communicating passages between the chambers for mounting the endless conveyer so that its conveying stretch travels across one side of the common wall within the material receiving chamber and its return stretch is disposed on the other side of the common wall within the air chamber, and means cooperating with the endless conveyer to limit the degree of communication between the chambers at one passage.

10. In a pneumatic conveyer, an air chamber, a material receiving chamber, said chambers having one wall common to both, there being a communicating passage between the chambers at both ends of the common wall, means for discharging a conveying pressure current of air into the air chamber, an endless conveyer, means mounting the endless conveyer so that it passes through the communicating passages at opposite ends of the common wall to have its conveying stretch on one side of the common wall within the material receiving chamber and its return stretch on the other side of the common wall within the air chamber, and a member adjacent one communicating passage and extending toward the center of the common wall in substantial parallelism therewith to define a flat space through which the endless conveyer passes, said space being of such size that the endless conveyer passing therethrough limits the degree of communication between the chambers through the said passage.

11. In a pneumatic conveyer, an air chamber, a material receiving chamber above the air chamber, a partition forming the bottom of the material receiving chamber and the top of the air chamber, there being communicating passages between the chambers at the ends of the partition, means for discharging a conveying pressure current of air into the air chamber, an endless conveyer for carrying material from the material receiving chamber into the air chamber, means adjacent the communicating passages for mounting the endless conveyer so that its conveying stretch travels over the partition within the material receiving chamber and its return stretch travels beneath the partition within the air chamber, and a wall adjacent the communicating passage at one end of the partition and disposed in substantial parallel spaced relation to said end portion of the partition, the space between the wall and said end portion of the partition enabling the endless conveyer to pass therethrough and being of such size that the conveyer in passing therethrough limits the degree of communication between the chambers therethrough.

12. In a pneumatic conveyer, an air chamber, a material receiving chamber above the air chamber, a partition separating the chambers and forming the bottom of the material receiving chamber and the top of the air chamber, said partition terminating short of the ends of the chambers to afford communication passages between the chambers at opposite ends of the partition, means for discharging a conveying pressure current of air into the air chamber, an endless conveyer for carrying material from the material receiving chamber into the air chamber, means adjacent the ends of the partition for mounting the endless conveyer with its conveying stretch positioned above the partition within the material receiving chamber and its return stretch beneath the partition within the air chamber, and a wall forming part of the top of the air chamber and overlying one end portion of the partition in substantial parallel spaced relation whereby the communication between the chambers at said end of the partition is only through the space between said end portion of the partition and the overlying wall, and the space between the overlying wall and the said end portion of the partition being such that the endless conveyer in passing therethrough substantially closes the same to practically close off communication between the chambers at said end of the partition.

13. In a pneumatic conveyer, an air chamber, means for discharging a pressure current of air into the air chamber, a material receiving chamber above the air chamber, a partition separating the chambers, a conveyer having its conveying stretch within the material receiving chamber and its return stretch within the air chamber and passing from one chamber to the other through spaced communicating passages, a material receiving hopper mounted adjacent one of said communicating passages for depositing material into the material receiving chamber, said hopper having its discharge spaced from the partition so that the material falls therefrom onto the partition, means cooperating with the partition to restrict the adjacent communicating passage whereby a small amount of air from the air chamber enters the material receiving chamber, and means for causing said air to pass through the material as it falls from the hopper onto the partition to clean the same.

14. In a pneumatic conveyer, an air chamber, means for discharging a pressure current of air into the air chamber, a material receiving chamber above the air chamber, a partition separating the chambers, said partition forming the bottom of the material receiving chamber and the top of the air chamber, a conveyer for carrying materials along the partition within the material receiving chamber to a communicating passage between the chambers, a hopper above the partition and having its discharge end spaced from the partition so that material falls from the hopper onto the partition to be conveyed therealong, and means for conducting the portion of the air from the air chamber through the material as it falls from the hopper onto the partition.

15. In a pneumatic conveyer, an air duct, means for discharging a pressure current of air into the air duct, a material receiving chamber above the air duct with the bottom thereof forming the top of the air duct, an endless conveyer having its conveying stretch within the material receiving chamber and its return stretch within the air duct and passing through a communicating passage between the air duct and the chamber, said communicating passage permitting a portion of the air within the air duct to enter the material receiving chamber, a hopper for receiving materials to be deposited into the material receiving chamber, said hopper having its discharge spaced from the bottom of the material receiving chamber so that material falls therefrom in a curtain, and means whereby the air entering the material receiving chamber through said communicating passage passes through the curtain of falling material.

16. In a pneumatic conveyer of the character described, an air duct, a blower discharging a pressure current of air into said air duct, a hopper having its inlet near the blower and feeding material onto the upper wall of said air duct, and an endless conveyer having its conveying run operable over the upper wall of said air duct and its return beneath said wall of the air duct and within said air duct.

17. In a pneumatic conveyer of the character described, a blower, an air duct in communication with the discharge of said blower, a material conveying duct mounted on said air duct and communicating at the end thereof remote from said blower with said air duct, a hopper for the material conveying duct at the end thereof adjacent said blower, and a continuous conveyer mounted in said material conveying duct directly above said air duct to carry material along the material conveying duct to its said communication with the air duct remote from the blower and having the return thereof within said air duct.

18. In a pneumatic conveyer of the character described, a blower, an air duct in communication with the discharge of said blower, a material conveying duct mounted on said air duct and communicating at the end thereof remote from said blower with said air duct, a hopper for the material conveying duct at the end thereof adjacent said blower, a continuous conveyer mounted with its conveying stretch in said material conveying duct and entering the air duct at said communication between the ducts to have the return thereof within said air duct and to leave the air duct to return to the material conveying duct at the hopper end, and means cooperating with material passing through said material conveying duct to prevent the passage of air from the air duct out through the material conveying duct.

19. A pneumatic conveyer apparatus comprising a casing having spaced walls, a partition connecting the spaced walls and dividing the casing into a material receiving chamber and an air chamber, said casing having an outlet common to both chambers and in line with the material receiving chamber, a conveyer for carrying materials deposited into the material receiving chamber forwardly over the partition toward the common outlet, and means for projecting a conveying current of air into the air chamber beneath the partition.

20. A pneumatic conveyer comprising a casing including side walls and having an outlet adapted for connection with a conveyer duct, a partition connecting the side walls and dividing the casing into an upper and a lower chamber, said partition being substantially on a plane with the bottom of the outlet leading from the casing so that the upper chamber is in line with the outlet, a conveyer for carrying materials deposited in said upper chamber toward the outlet, and means for introducing a conveying current of air into the lower chamber to pick up the materials conveyed toward the outlet and carry them therethrough.

21. A pneumatic conveyer of the character described, comprising separated chambers having a common outlet, said outlet being on a plane with one of the chambers, a hopper connected with said chamber to receive materials to be conveyed, a mechanical conveyer for carrying the materials forwardly in a straight line toward the outlet, and means for introducing a conveying current of air into the other chamber to pick up the material as it reaches the outlet and carry it therethrough.

22. A pneumatic conveyer of the character described comprising a casing having an outlet at one end, a partition dividing the casing into a material receiving chamber and an air chamber with the material receiving chamber above the air chamber and in line with the outlet, a hopper for the material receiving chamber remote from the outlet, an endless conveyer having its conveying stretch movable over the partition within the material receiving chamber to carry material toward the outlet and having its return stretch positioned within the air chamber beneath the partition, and an air blower to one side of the casing and having its outlet connected with the air chamber beneath the partition so that the return stretch of the conveyer is subjected to the cleaning influence of the air and the material conveyed toward the outlet is picked up by the air current and carried through the outlet.

23. In a pneumatic conveyer apparatus, an enclosure providing an air duct and having spaced front and back openings, an endless mechanical conveyer entering the enclosure through the front opening and leaving the same through the back opening, said endless mechanical conveyer carrying material into the enclosure through the front opening, and means for introducing a pressure current of air into the enclosure to move forwardly toward the front opening, the point of introduction of the current of air being removed sufficiently far from the front opening to insure a substantially solid column of forwardly moving air between the openings to prevent material moving backward from the front opening.

24. In a pneumatic conveyer apparatus, a casing providing an air pasage with a material inlet opening thereto adjacent its front end, a material hopper positioned considerably to the rear of the material inlet opening, an endless mechanical conveyer for carrying material from the hopper to said material inlet opening, said endless mechanical conveyer entering the air passage at the inlet opening and leaving the air passage at a substantial distance to the rear of the material inlet opening and near the hopper, and means for introducing a pressure current of air into the air passage at a substantial distance to the rear of the material inlet opening, to move forwardly toward the material entrance in a substantially solid column whereby backward movement of the material from the inlet opening to the point of egress of the conveyer from the air passage is prevented.

25. A pneumatic conveyer of the character described, comprising an enclosure forming an air duct and having a material inlet, means communicated with the duct at a distance from the material inlet for producing a conveying current of air in the duct, and an endless conveyer entering the duct at the material inlet to carry the material into the duct and having its return stretch moving toward the entrance of the conveying current of air into the duct to leave the duct at a substantial distance from the material inlet whereby a substantial portion of the return stretch travels within the air duct, and a relatively long column of conveying air exists between the entrance of the material into the duct and the point of egress of the conveyer therefrom.

26. In a pneumatic conveyer apparatus of the character described, a conveyer duct, means to establish a pressure current of air in the conveyer duct, and means to feed material into the conveyer duct to be carried along by the pressure current of air, comprising a material feed duct closed for a substantial length and connected with the conveyer duct, and an endless mechanical conveyer having its forwardly moving stretch in the material feed duct to enter the conveyer duct at its connection with the feed duct and having its return stretch travelling directly within the conveyer duct a substantial distance before leaving the same to return to the material feed duct, said distance being sufficient to insure the maintenance of a dense column of forwardly moving air under pressure between the points of ingress and egress of the mechanical conveyer to and from the conveyer duct.

27. In a pneumatic conveyer apparatus of the character described, a conveyer duct, means to establish a pressure current of air in the conveyer duct, and means to feed material into the conveyer duct to be carried along by the pressure current of air, comprising a material feed duct closed for a substantial length and connected with the conveyer duct, an endless mechanical conveyer having its forwardly moving stretch in the material feed duct to enter the conveyer duct at its connection with the feed duct and having its return stretch travelling directly within the conveyer duct a substantial distance before leaving the same to return to the material feed duct, said distance being sufficient to insure the maintenance of a dense column of forwardly moving air under pressure between the points of ingress and egress of the mechanical conveyer to and from the conveyer duct, and valve means within the material feed duct to prevent back-draft from carrying material back through the material feed duct.

28. In a pneumatic conveyer apparatus of the character described, an elongated closed conveyer duct having a pair of openings spaced longitudinally from each other a substantial distance with the walls of the duct between said openings imperforate, means to establish a pressure current of air in said duct, said means communicating with the duct at a point so related to the spaced openings as to insure a dense column of forwardly moving air between the spaced openings, and means to feed material into the conveyer duct comprising a material feed duct connected through the forward-most opening with the conveyer duct, said material feed duct being closed rearwardly of its connection with the conveyer duct for a substantial distance and opening into a hopper arranged to receive the material to be conveyed, and an endless mechanical conveyer having its forwardly moving stretch travelling within the feed duct to carry material from the hopper through the feed duct and into the conveyer duct through said forward-most opening, said endless mechanical conveyer entering the conveyer duct at said forward-most opening and having its return stretch travelling entirely within the conveyer duct to leave the same at the other of said openings.

GEORGE BERNERT.